(12) United States Patent
Kuo et al.

(10) Patent No.: US 7,715,186 B2
(45) Date of Patent: May 11, 2010

(54) CASE OF EXTENDING BASE FOR ELECTRONIC DEVICE

(75) Inventors: Ping-Huang Kuo, Taipei (TW);
Yi-Hsun Hung, Taipei (TW);
Ming-Chan Hsieh, Taipei (TW);
Chia-Min Cheng, Taipei (TW)

(73) Assignee: Inventec Corporation, Taipei (TW)

( * ) Notice: Subject to any disclaimer, the term of this patent is extended or adjusted under 35 U.S.C. 154(b) by 726 days.

(21) Appl. No.: 11/707,912

(22) Filed: Feb. 20, 2007

(65) Prior Publication Data

US 2008/0198537 A1    Aug. 21, 2008

(51) Int. Cl.
*G06F 1/16* (2006.01)
(52) U.S. Cl. .............. 361/679.4; 361/679.41; 361/679.45; 312/223.1; 312/223.2
(58) Field of Classification Search .............. 361/679.4, 361/679.41
See application file for complete search history.

(56) References Cited

U.S. PATENT DOCUMENTS

| | | | | |
|---|---|---|---|---|
| 5,159,533 A * | 10/1992 | Kuang | .................... | 361/679.43 |
| 5,199,888 A * | 4/1993 | Condra et al. | ................ | 439/142 |
| 5,460,547 A * | 10/1995 | Belt et al. | .................... | 439/638 |
| 5,568,359 A * | 10/1996 | Cavello et al. | ......... | 361/679.43 |
| 5,574,625 A * | 11/1996 | Ohgami et al. | ......... | 361/679.09 |
| 5,724,226 A * | 3/1998 | Ruch et al. | .............. | 361/679.41 |
| 5,738,536 A * | 4/1998 | Ohgami et al. | ............... | 439/142 |
| 5,738,537 A * | 4/1998 | Setoguchi et al. | ........... | 439/159 |
| 5,837,942 A * | 11/1998 | Becker | .................... | 174/138 F |
| 6,002,581 A * | 12/1999 | Lindsey | ................. | 361/679.55 |
| 6,043,976 A * | 3/2000 | Su | ........................ | 361/679.41 |
| 6,501,646 B2 * | 12/2002 | Suzuki | ................... | 361/679.41 |
| 6,519,142 B1 * | 2/2003 | Lai et al. | ................ | 361/679.09 |
| 6,674,639 B2 * | 1/2004 | Wang et al. | ............ | 361/679.32 |
| 6,709,032 B2 * | 3/2004 | Huang | ........................ | 292/201 |
| 6,757,166 B2 * | 6/2004 | DeLuga et al. | ......... | 361/679.57 |
| 6,948,966 B2 * | 9/2005 | Kambayashi et al. | ....... | 439/362 |
| 7,123,487 B2 * | 10/2006 | Saito et al. | ................... | 361/801 |
| 7,443,661 B2 * | 10/2008 | Xu et al. | ................ | 361/679.55 |
| 7,503,808 B1 * | 3/2009 | O'Shea | ........................ | 439/639 |
| 7,639,495 B2 * | 12/2009 | Chen et al. | ............... | 361/679.6 |
| 2002/0154478 A1 * | 10/2002 | Kamimaki et al. | .......... | 361/686 |
| 2004/0061996 A1 * | 4/2004 | Kamphuis et al. | ........... | 361/683 |
| 2005/0286216 A1 * | 12/2005 | Chen et al. | ................... | 361/683 |
| 2006/0221561 A1 * | 10/2006 | Guo et al. | ................... | 361/679 |

* cited by examiner

*Primary Examiner*—Jayprakash N Gandhi
*Assistant Examiner*—Anthony Q Edwards
(74) *Attorney, Agent, or Firm*—Muncy, Geissler, Olds, & Lowe, PLLC

(57) ABSTRACT

A case of an extending base for an electronic device includes a body, a cover, and at least two link elements. The body has a hollow. The cover is disposed aside the hollow. Each link element has a first pivot part, a first block part, a second pivot part, and a first elastic member. The first pivot part has a first end pivoted on the body and a second end connected to the first block part. The second pivot part has a first end pivoted on the cover and a second end connected to the first block part. The first elastic member provides a force to push the first block part from a first position to a second position so as to correspondingly push the cover. Herein, when the first block part is positioned at the first position, the first block part is separated from the body and the cover covers the body. In addition, when the first block part is positioned at the second position, the first block part is in contact with the body and the cover is separated from the body.

8 Claims, 4 Drawing Sheets

CASE OF EXTENDING BASE FOR ELECTRONIC DEVICE

BACKGROUND OF THE INVENTION

1. Field of Invention

The invention relates to a case and, in particular, to a case of an extending base for an electronic device.

2. Related Art

Laptop computers have the advantages of being light and compact. For the sake of mobility, some of them have fewer peripheral input/output (I/O) ports in order to reduce the number of elements and the size. For non-mobile applications, the laptop computer can be connected to an I/O port extending base for complete peripheral I/O functions.

Generally speaking, the I/O port extending base has specific sizes for specific models of laptop computers. For example, the extending base for a 14-inch laptop computer usually cannot connect with a 15-inch laptop computer. In that case, the manufacturers have to make extending bases for each size laptop computer. This inevitably increases the product cost.

Moreover, various types of I/O ports (e.g., RS-232, RJ-45, PS2, VGA, USB, etc) on the usual extending base are directly exposed. Although it is easier for the user to plug in or unplug cables, the overall appearance of the laptop computer suffers due to the exposed I/O ports. Moreover, dust is likely to accumulate thereon. If these I/O ports are hidden inside a case, the appearance is improved. However, the space of such a case is limited and it is more difficult for the user to plug in or unplug cables.

Therefore, it is an important subject to provide a case of an extending base for an electronic device that can solve the above mentioned problems.

SUMMARY OF THE INVENTION

In view of the foregoing, the invention is to provide a case of an extending base for an electronic device that can be easily opened.

To achieve the above, the invention discloses a case of an extending base including a body, a cover, and at least two link elements. The body has a hollow, and the cover is disposed aside the hollow. Each link element has a first pivot part, a first block part, a second pivot part, and a first elastic member. The first pivot part has a first end pivoted on the body and a second end connected to the first block part. The second pivot part has a first end pivoted on the cover and a second end connected to the first block part. The first elastic member provides a force to push the first block part from a first position to a second position so as to correspondingly push the cover. Herein, when the first block part is positioned at the first position, the first block part is separated from the body and the cover covers the body. In addition, when the first block part is positioned at the second position, the first block part is in contact with the body and the cover is separated from the body.

As mentioned above, the case of an extending base for an electronic device according to the invention has the link elements to help to open its cover. The hollow of the body can be exposed once the cover is opened. Thus, it is convenient for the user to plug/remove cables into/from the I/O ports of the case.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
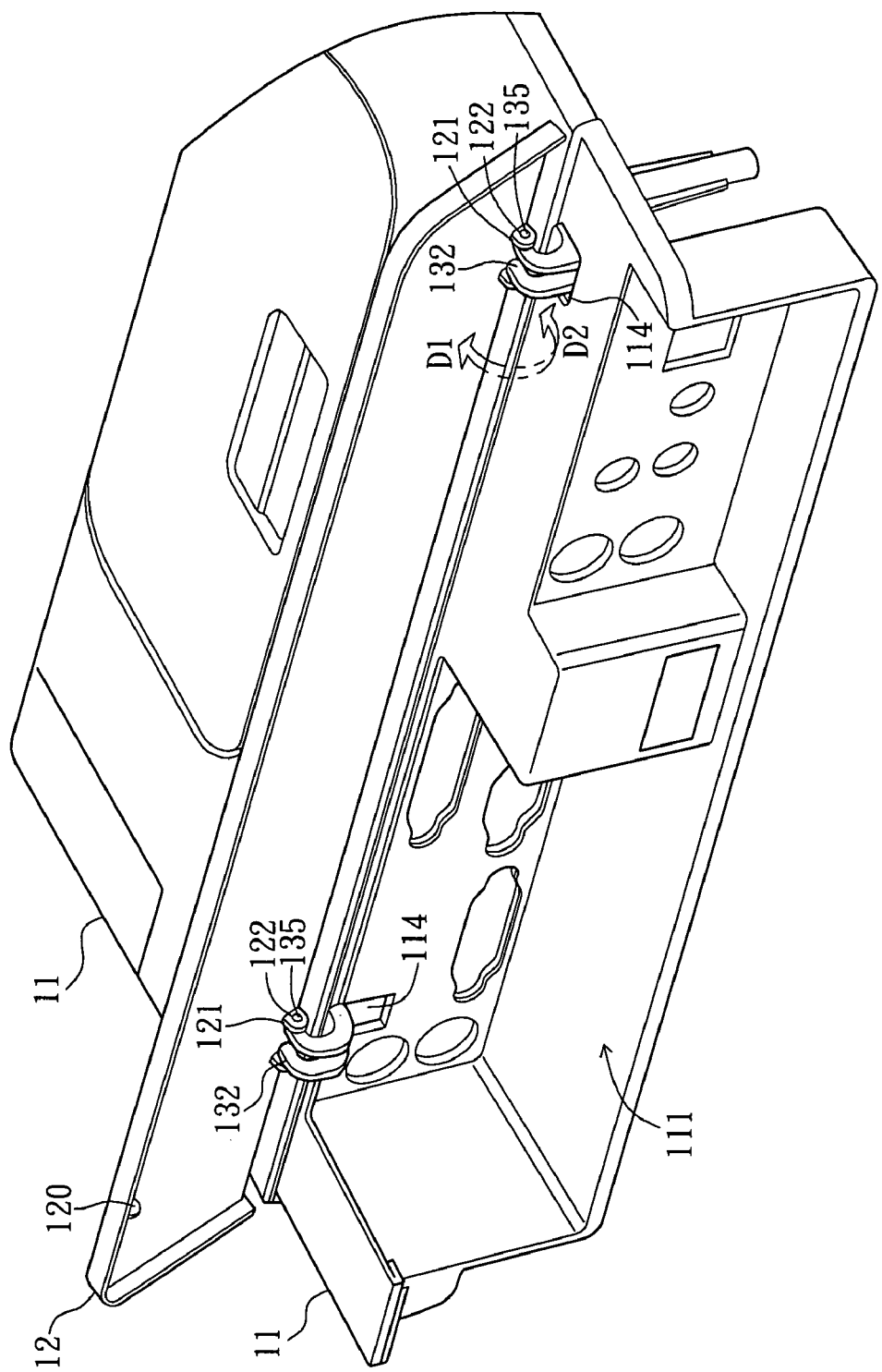
FIG. 1 is a schematic view of a case of an extending base according to a preferred embodiment of the invention.
Figure 2:
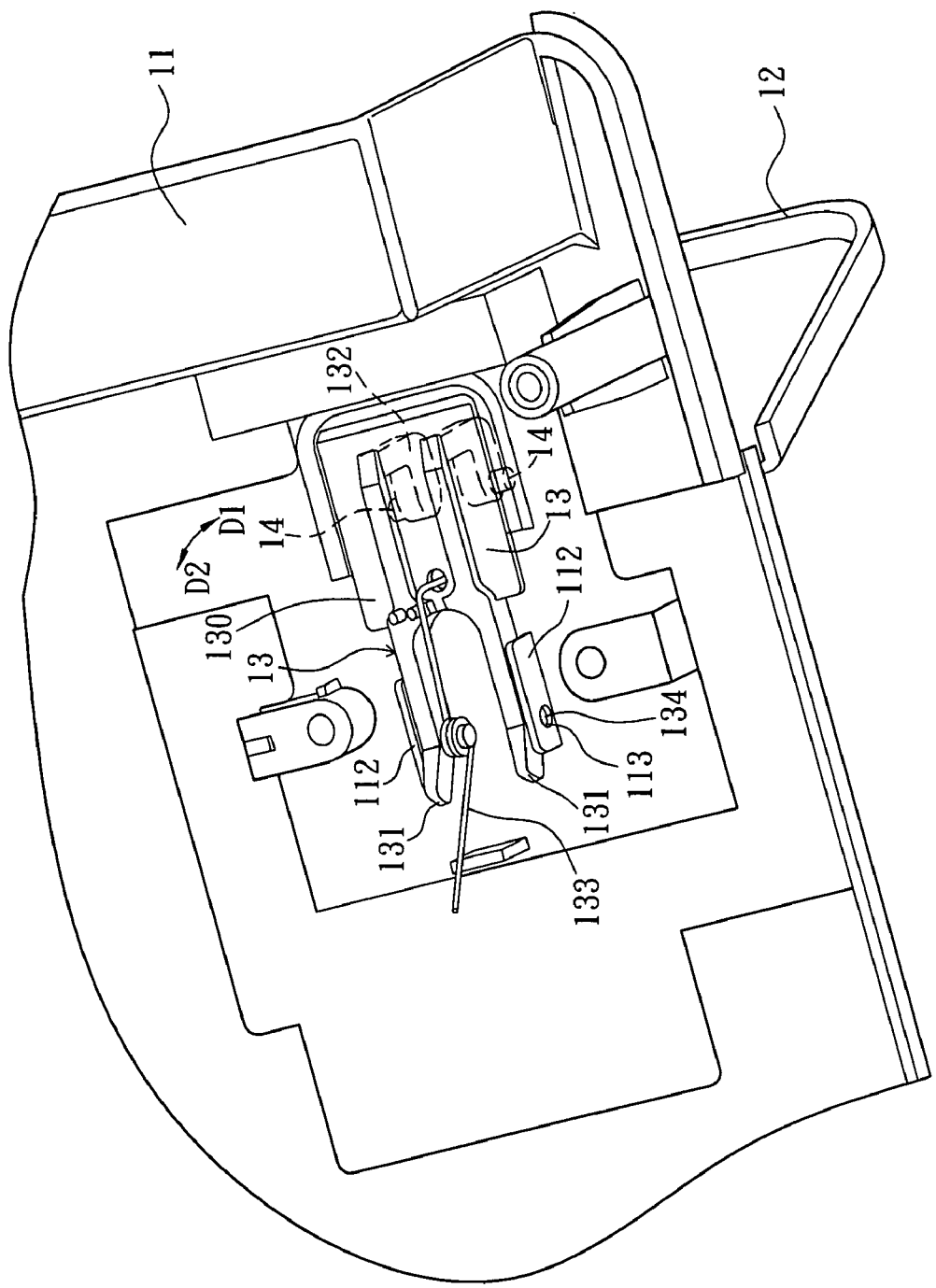
FIG. 2 is a schematic view of the link element in FIG. 1.

FIG. 1 is a schematic view of the case of an extending base for an electronic device according to a preferred embodiment of the invention. FIG. 2 is a schematic view showing the link element and the auxiliary positioning element inside the case 1. As shown in FIGS. 1 and 2, the disclosed case 1 of an extending base for an electronic device includes a body 11, a cover 12, and at least two link elements 13. The body 11 has a hollow 111, two bases 112, and two through holes 114. The cover 12 is disposed aside the hollow 111. Each link element 13 has a first block part 130, a first pivot part 131, a second pivot part 132, and a first elastic member 133. The first pivot part 131 has a first end pivoted on the body 11 and a second end connected to the first block part 130. The second pivot part 132 has a first end pivoted on the cover 12 and a second end connected to the first block part 130. The first elastic member 133 provides a force to push the first block part 130 from a first position to a second position so as to correspondingly push the cover 12.

When the first block part 130 is positioned at the first position, the first block part 130 is separated from the body 11 and the cover 12 covers the body 11. When the first block part 130 is pushed by the first elastic member 133 and then positioned at the second position, the first block part 130 is in contact with the body 11 and the cover 12 is separated from the body 11.

In this embodiment, the cover 12 and the first block part 130 of the link element 13 are respectively installed on two opposite surfaces of the body 11. The cover 12 is disposed on the outer surface of the body 11 and partially covers the hollow 111. The first block part 130 of the link element 13 is disposed on the inner surface of the body 11. To connect the link element 13 and the cover 12, the second pivot part 132 of the link element 13 goes through the through hole 114 and extends toward the hollow 111. In addition, the second pivot part 132 of the link element 13 pivots about the cover 12.

The first end of the first pivot part 131 pivots on the base 112 of the body 11. In more detailed, the base 112 has small holes 113, and the first pivot part 131 has protruding parts 134. The first end of the first pivot part 131 of the link element 13 can be pressed inward before it is put into the base 112. Accordingly, the protruding parts 134 of the link element 13 can be inserted into the small holes 113 on the base 112. Therefore, the link element 13 can rotate about the axis of the first end of the first pivot part 131, which is also the center of the small holes 113. In this case, the axis is parallel to the body 11.

The first elastic member 133 is a torsion spring disposed by the base 112. Its one end is connected to the first block part 130, and its other end is disposed on the body 11 or connected to the body 11. When the cover 12 covers the body 11, the first block part 130 is positioned at the first position (the first block part 130 is separated from the body 11). In this case, the first elastic member 133 is depressed and produces an elastic restoring force. To open the cover 12 with respect to the body 11, the link element 13 rotates along a first direction D1 so that the first block part 130 touches the body 11. Additionally, the second pivot part 132 pushes the cover 12 away from the hollow 111. The elastic restoring force helps rotate the link element 13 along the first direction D1. Therefore, the cover 12 can be readily opened, exposing the hollow 111. It this thus convenient for the user to plug/remove a cable into/from the I/O port in the hollow 111 of the body 1.

Moreover, the user can exert a force on the cover 12, so that it moves toward the body 11. In this case, the link element 13 rotates along a second direction D2, while the first block part 130 departs from the body 11 until the cover 12 covers the body 11.

Since the elastic restoring force of the first elastic member 133 tends to push the cover 12 away from the body 11, the cover 12 has a plurality of hooks 120 in order to fix the cover 12 to the body 11. The hooks 120 can catch the body 11, so that the cover 12 can be fixed to the body 11.

Moreover, the first end of the second pivot part 132 is pivoted on a base 121 of the cover 12. The base 121 has small holes 122, and the second pivot part 132 has protruding parts 135. The first end of the second pivot part 132 of the link element 13 can be pressed inward before it is put into the base 121. Accordingly, the protruding parts 135 of the link element 13 can be inserted into the small holes 122 on the base 121. Therefore, the link element 13 can rotate about the axis of the first end of the second pivot part 132, which is also the center of the small holes 122. In this case, the axis is parallel to the cover 12.

After the cover 12 is departed from the hollow 111, it can rotate about the first end of the second pivot part 132 to expose the whole hollow 111. This makes it convenient for the user to use elements disposed inside the hollow 111 of the body 11.

Figure 3:
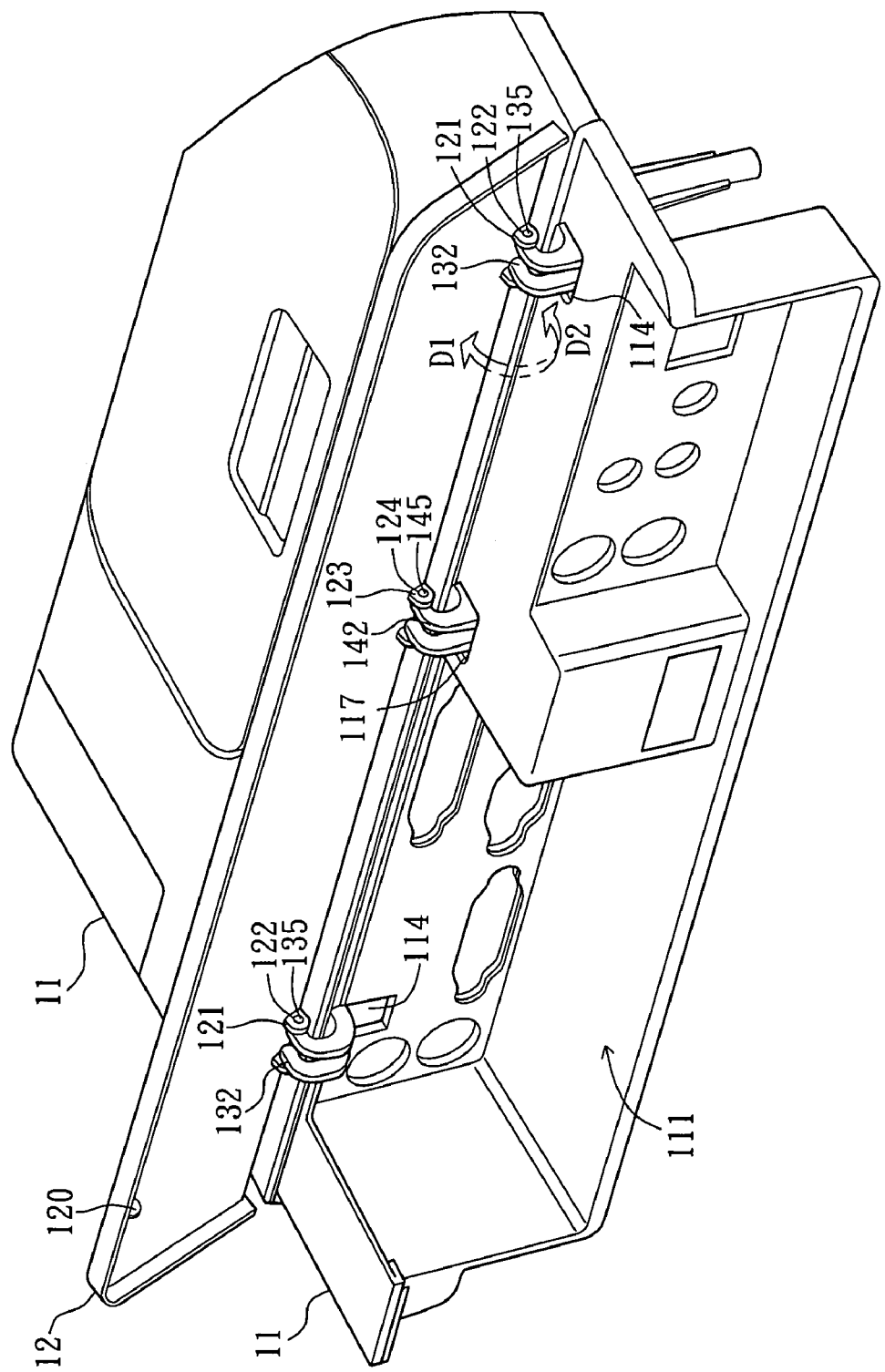
FIG. 3 is another schematic view of the case of an extending base according to the preferred embodiment of the invention.
Figure 4:
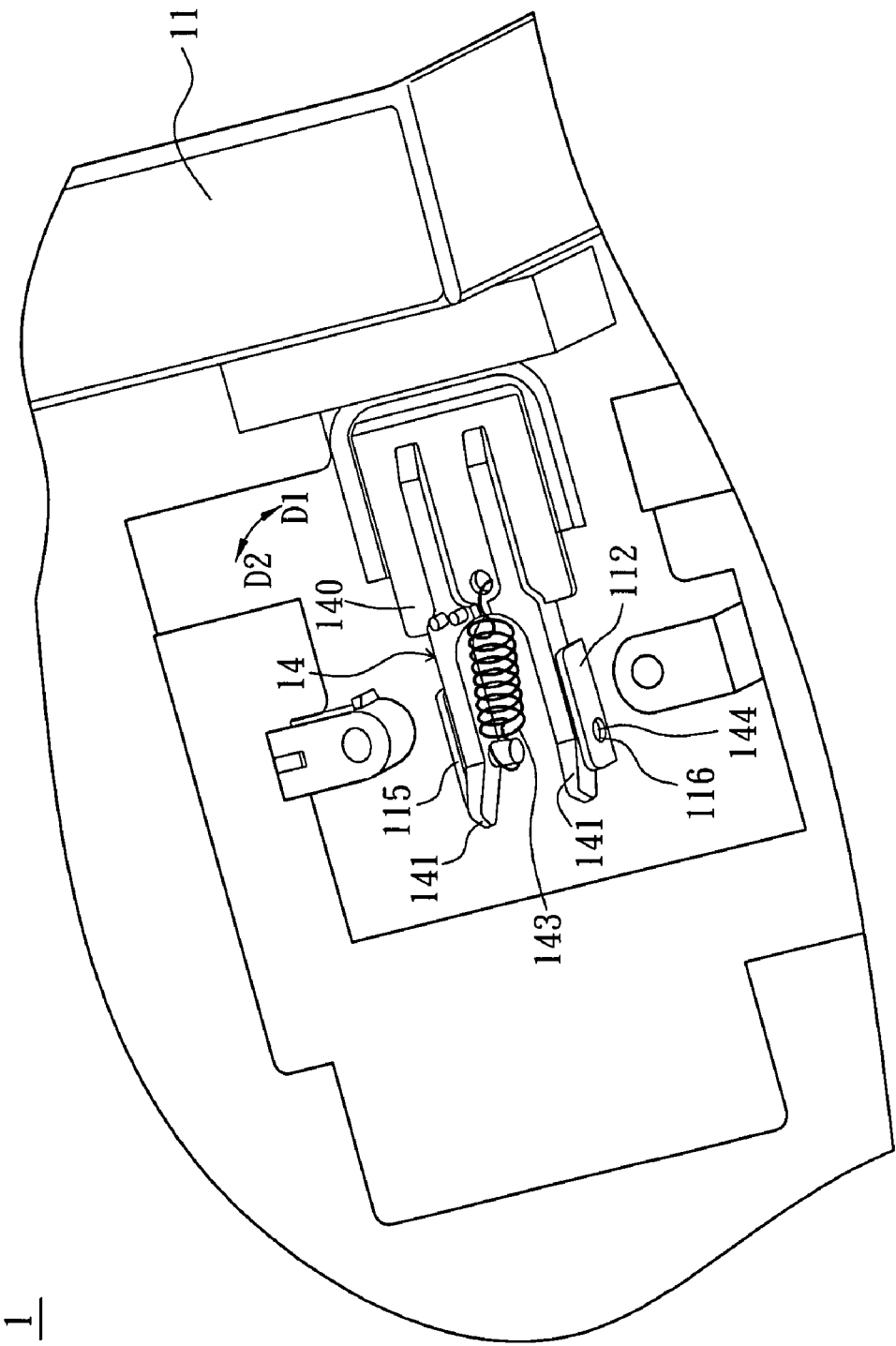
FIG. 4 is a schematic view of the auxiliary positioning element in FIG. 3.

Moreover, FIG. 3 is another schematic view of the disclosed case of the extending base of an electronic device. FIG. 4 is a schematic view of the auxiliary positioning element inside the case 3. To increase the stability between the cover 12 and the body 11 when the former covers or separates from the latter, the case 1 further includes an auxiliary positioning element 14. The auxiliary positioning element 14 has a second block part 140, a third pivot part 141, a fourth pivot part 142, and a second elastic member 143. The third pivot part 141 has a first end pivoted on the body 11 and a second end connected to the second block part 140. The fourth pivot part 142 has a first end pivoted on the cover 12 and a second end connected to the second block part 140. The second elastic member 143 provides a force to pull the second block part 140 toward the first end of the third pivot part 141. The second block 140 is thus positioned at the first position or the second position.

When the second block part 140 is positioned at the first position, the second block part 140 is separated from the body 11 and the cover 12 covers the body 11. When the second block part 140 is positioned at the second position, the second block part 140 is in contact with the body 11 and the cover 12 is separated from the body 11.

The first end of the third pivot part 141 is pivoted on a base 115 of the body 11. In the embodiment, the third pivot part 141 has protruding parts 144. The third pivot part 141 can be pressed inward before it is put into the base 115. The protruding parts 144 can be inserted into the small holes 116 on the base 115. Therefore, the auxiliary positioning element 14 can rotate about the axis of the first end of the first pivot part 141, which is also the center of the small holes 116. The rotational axis is parallel to the body 11.

The auxiliary positioning element 14 is disposed on the inner surface of the body 11. In order for the auxiliary positioning element 14 and the cover 12 to be combined together, the fourth pivot part 142 of the auxiliary positioning element 14 goes through a through hole 117 of the body 11 and extends toward the hollow 111. In addition, the fourth pivot part 142 of the auxiliary positioning element 14 pivots on the cover 12.

The first end of the fourth pivot part 142 is pivoted on a base 123 of the cover 12. The base 123 has small holes 124, and the fourth pivot part 142 has protruding parts 145. The second end on the fourth pivot part 142 of the auxiliary positioning element 14 can be pressed inward before it is put into the base 123. The protruding parts 145 of the auxiliary positioning element 14 can be inserted into the small holes 124 on the base 123. Therefore, the auxiliary positioning element 14 can rotate about the axis of the second end of the fourth pivot part 142, which is also the center of the small holes 124. The rotational axis is parallel to the cover 12.

The second elastic member 143 is an extension spring, with its both ends connecting to the base 115 and the second block part 140. The second elastic member 143 has a larger elastic restoring force than the first elastic member 133. The restoring forces of the two elastic members are in opposite directions.

When the second block part 140 is positioned at the first position, the second block part 140 is separated from the body 11 and the cover 12 covers the body 11. The second elastic member 143 pulls the second block part 140 so that the cover 12 stably covers the body 11.

When the second block part 140 is positioned at the second position, the second block part 140 is in contact with the body 11 and the cover 12 is separated from the body 11. The elastic restoring force of the second elastic member 143 has a zero or almost zero component along the second direction D2. Therefore, the second elastic member 143 does not pull the second block part 140 to rotate along the second direction D2.

Furthermore, to cover the body 11 with the cover 12, the second elastic member 143 with a larger elastic restoring force helps pull the second block part 140 to rotate along the second direction D2 and to move the cover 12 toward the hollow 111. Therefore, the second block part 140 departs from the body 11, and the cover 12 covers the body 11.

In this embodiment, the case 1 is the case of the extending base of an electronic device (e.g., a laptop computer). The hollow 111 of the body 11 accommodates the RS-232, RJ-45, PS2, VGA, and USB I/O ports. The user can plug/remove cables into/from the I/O ports.

In summary, the case of an extending base for an electronic device according to the invention has the link elements to help to open its cover. The hollow of the body can be exposed once the cover is opened. Thus, it is convenient for the user to plug/remove cables into/from the I/O ports of the case.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A case, comprising:

a body, which has at least one hollow;

a cover, which is disposed aside the hollow; and at least two link elements, each of which has a first pivot part, a first block part, a second pivot part, and a first elastic member;

wherein the first pivot part has a first end pivoted on the body and a second end connected to the first block part, the second pivot part has a first end pivoted on the cover and a second end connected to the first block part, the first elastic member provides a force to push the first block part from a first position to a second position so as to correspondingly push the cover, the first block part is separated from the body and the cover covers the body when the first block part is positioned at the first position, and the first block part is in contact with the body and the cover is separated from the body when the first block part is positioned at the second position.

2. The case of claim 1, wherein the body further includes at least two through holes for the second pivot parts to go through.

3. The case of claim 1, wherein the first elastic member is a torsion spring.

4. The case of claim 1, wherein the body further has at least one auxiliary positioning element having a third pivot part, a second block part, a fourth pivot part, and a second elastic member, the third pivot part has a first end pivoted on the body and a second end connected to the second block part, the fourth pivot part has a first end pivoted on the cover and a second end connected to the second block part, and the second elastic member provides a force to pull the second block part toward the third pivot part, thereby positioning the second block part at a first position or a second position.

5. The case of claim 4, wherein when the second block part is positioned at the first position, the second block part is separated from the body and the cover covers the body; and when the second block part is positioned at the second position, the first block part is in contact with the body and the cover is separated from the body.

6. The case of claim 4, wherein the first elastic member is an extension spring.

7. The case of claim 1, wherein the cover further has at least one hook to catch the body.

8. The case of claim 1, wherein the case is for an extending base for an electronic device.

* * * * *